United States Patent
Wei

(10) Patent No.: US 11,360,304 B2
(45) Date of Patent: Jun. 14, 2022

(54) IMAGE DISTORTION DETECTION METHOD AND SYSTEM

(71) Applicant: BOE Technology Group Co., Ltd., Beijing (CN)

(72) Inventor: Wei Wei, Beijing (CN)

(73) Assignee: BOE TECHNOLOGY GROUP CO., LTD., Beijing (CN)

(*) Notice: Subject to any disclaimer, the term of this patent is extended or adjusted under 35 U.S.C. 154(b) by 0 days.

(21) Appl. No.: 16/767,147

(22) PCT Filed: Nov. 29, 2018

(86) PCT No.: PCT/CN2018/118275
§ 371 (c)(1),
(2) Date: May 27, 2020

(87) PCT Pub. No.: WO2019/105433
PCT Pub. Date: Jun. 6, 2019

(65) Prior Publication Data
US 2020/0386992 A1      Dec. 10, 2020

(30) Foreign Application Priority Data
Nov. 30, 2017 (CN) .......... 201711235491.8

(51) Int. Cl.
*G09G 5/00* (2006.01)
*G02B 27/01* (2006.01)

(52) U.S. Cl.
CPC .... *G02B 27/0103* (2013.01); *G02B 2027/011* (2013.01); *G02B 2027/0138* (2013.01)

(58) Field of Classification Search
CPC .......... G02B 27/0103; G02B 2027/011; G02B 2027/0138
USPC .................................................... 345/7
See application file for complete search history.

(56) References Cited

U.S. PATENT DOCUMENTS 6,329,768 B1 * 12/2001 Giard ............... H04N 3/233
315/370
2007/0263902 A1    11/2007 Higuchi et al.
2012/0182416 A1 *  7/2012 Kawaguchi ........ H04N 9/3194
348/128

(Continued)

FOREIGN PATENT DOCUMENTS

CN         102706536 A       10/2012
CN         106127701 A       11/2016

OTHER PUBLICATIONS

International search report of PCT application No. PCT/CN2018/118275 dated Feb. 15, 2019.

*Primary Examiner* — Jonathan M Blancha
(74) *Attorney, Agent, or Firm* — Fay Sharpe LLP

(57) ABSTRACT

Provided is an image distortion detection method including: controlling an image output device to output a test image; shooting the test image by an image acquisition apparatus to obtain an imaged picture, the imaged picture being a picture shot when the image acquisition apparatus focuses on an imaging position of the image output device, and the image acquisition apparatus being arranged at a set viewpoint of the image output device; and determining whether image distortion meets a requirement based on widths of lines in the imaged picture. Embodiments of the present disclosure can be used for detecting depth-of-field distortion of the image output by the image output device.

16 Claims, 5 Drawing Sheets

(56) References Cited

U.S. PATENT DOCUMENTS

| | | | |
|---|---|---|---|
| 2015/0054917 A1* | 2/2015 | Coon | G06K 9/00228 348/46 |
| 2015/0313467 A1* | 11/2015 | Sakai | A61B 3/0016 351/208 |
| 2016/0173868 A1* | 6/2016 | Shen | H04N 5/2257 348/187 |
| 2017/0195647 A1* | 7/2017 | Honkanen | H04N 9/315 |

* cited by examiner

US 11,360,304 B2

IMAGE DISTORTION DETECTION METHOD AND SYSTEM

CROSS-REFERENCE TO RELATED APPLICATION

The present application is a 371 of PCT Application No. PCT/CN2018/118275, filed on Nov. 29, 2018, which claims priority to Chinese Patent Application No. 201711235491.8, filed on Nov. 30, 2017 and entitled "IMAGE DISTORTION DETECTION METHOD AND SYSTEM", the content of which is incorporated herein by reference in its entirety.

TECHNICAL FIELD

The present disclosure relates to the field of display system testing technologies, and more particularly to an image distortion detection method and system.

BACKGROUND

With the development of science and technology, display technologies have applied more and more widely. For example, virtual image display technology, holographic image display technology and the like are gradually applied to people's daily lives. In this type of display technology, images are prone to depth-of-field distortion as they are not imaged on a display screen. In some scenes, requirements on imaging quality are higher. For instance, in a vehicle-mounted head-up display (HUD) upon which personal safety of a driver is relied, depth-of-field distortion of an image will bring in a potential danger. Therefore, it is necessary to detect the depth-of-field distortion of the output image.

SUMMARY

Embodiments of the present disclosure provide an image distortion detection method and system.

At least one embodiment of the present disclosure provides an image distortion detection method. The method includes: controlling an image output device to output a test image; shooting the test image by an image acquisition apparatus to obtain an imaged picture, the imaged picture being a picture shot when the image acquisition apparatus focuses on an imaging position of the image output device, and the image acquisition apparatus being arranged at a set viewpoint of the image output device; and determining whether image distortion meets a requirement based on widths of lines in the imaged picture.

Optionally, the test image is an image output by the image output device after a test pattern is input, and the test pattern is at least one selected from a group consisting of an equidistant grid pattern and an equiangular grid pattern.

In one implementation of embodiment of the present disclosure, shooting the test image by the image acquisition apparatus to obtain the imaged picture includes: placing a reference object at the imaging position of the image output device, a distance between the imaging position and the set viewpoint being equal to a set imaging distance; and enabling the image acquisition apparatus to focus on the reference object and shoot the test image to obtain the imaged picture.

In one implementation of embodiment of the present disclosure, shooting the test image by the image acquisition apparatus to obtain the imaged picture includes: adjusting a focal length of the image acquisition apparatus at a set pitch, and shooting the test image once after each adjustment to obtain a plurality of image pictures; and selecting the clearest image picture from the plurality of image pictures as the imaged picture.

Optionally, selecting the clearest image picture from the plurality of image pictures as the imaged picture includes: determining a width of a set line in each of the image pictures; and using an image picture in which the width of the set line is the smallest as the imaged picture.

Optionally, determining the width of the set line in each of the image pictures includes: determining widths of the set line at a plurality of measurement points, the plurality of measurement points being spaced on the set line along an extending direction of the set line; and determining the width of the set line according to the widths at the plurality of measurement points.

In one implementation of embodiment of the present disclosure, determining whether the image distortion meets the requirement based on the widths of the lines in the imaged picture includes: determining a maximum width value of the lines in the imaged picture; determining that the image distortion meets the requirement when the maximum width value is not greater than a set threshold; or determining that the image distortion meets the requirement when a ratio of the maximum width value to a width of a specified line is not greater than a set threshold; or determining that the image distortion meets the requirement when a difference between the maximum width value and a width of a specified line is not greater than the set threshold.

Optionally, determining the maximum width value of the lines in the imaged picture includes: acquiring brightness data of the imaged picture; determining two edges of each of the lines in the imaged picture according to the brightness data; determining a distance, in a direction perpendicular to an extending direction of the line, between the two edges of each of the lines in the imaged picture; and using the maximum distance among the determined distances as the maximum width value of the lines.

Optionally, determining the maximum width value of the lines in the imaged picture includes: converting the imaged picture into a grayscale image; binarizing the grayscale image to obtain a binarized image; determining, for each line in the binarized image, a number of pixel points that are of a set value continuously in a direction perpendicular to an extending direction of the line; and using the largest number in the determined numbers of pixel points as the maximum width value of the lines.

In another implementation of embodiments of the present disclosure, determining whether the image distortion meets the requirement based on the widths of the lines in the imaged picture includes: determining a position corresponding to a maximum width value of the lines in the imaged picture; adjusting a focal length of the image acquisition apparatus to enable the image acquisition apparatus to focus on the position corresponding to the maximum width value; determining a focal length when the image acquisition apparatus focuses on the position corresponding to the maximum width value; and determining whether the image distortion meets the requirement according to the focal length when the image acquisition apparatus focuses on the position corresponding to the maximum width value.

Optionally, determining the focal length when the image acquisition apparatus focuses on the position corresponding to the maximum width value includes: placing, after the image acquisition apparatus focuses on the position corresponding to the maximum width value, a reference object at the focus position of the image acquisition apparatus; and determining a distance between the reference object and the set viewpoint as the focal length when the image acquisition apparatus focuses on the position corresponding to the maximum width value.

Optionally, determining whether the image distortion meets the requirement according to the focal length when the image acquisition apparatus focuses on the position corresponding to the maximum width value includes: determining that the image distortion meets the requirement if the focal length when the image acquisition apparatus focuses on the position corresponding to the maximum width value is within a set range; and determining that the image distortion does not meet the requirement if the focal length when the image acquisition apparatus focuses on the position corresponding to the maximum width value is not within the set range.

Optionally, the image acquisition apparatus is an illuminometer or a charge-coupled device camera.

Optionally, the image output device includes a head-up display or a holographic image output device.

At least one embodiment of the present disclosure further provides an image distortion detection system. The system includes: an image acquisition apparatus configured to shoot a test image output by an image output device to obtain an imaged picture, the imaged picture being a picture shot when the image acquisition apparatus focuses on an imaging position of the image output device, and the image acquisition apparatus being arranged at a set viewpoint of the image output device; and a control apparatus configured to determine whether image distortion meets a requirement based on widths of lines in the imaged picture.

In one implementation of embodiments of the present disclosure, the image distortion detection system further includes a reference object, wherein the reference object is placed at the imaging position of the image output device, and a distance between the imaging position and the set viewpoint is equal to a set imaging distance; and the image acquisition apparatus is configured to focus on the reference object and shoot the test image to obtain image pictures.

In another implementation of embodiments of the present disclosure, the image acquisition apparatus is configured to adjust a focal length at a set pitch, and shoot the test image once after each adjustment of the focal length to obtain a plurality of image pictures; and the control apparatus is configured to select the clearest image picture from the plurality of image pictures as the imaged picture.

Optionally, the control apparatus is configured to determine a maximum width value of the lines in the imaged picture; and determine that the image distortion meets the requirement when the maximum width value is not greater than a set threshold, or determine that the image distortion meets the requirement when a ratio of the maximum width value to a width of a specified line is not greater than a set threshold, or determine that the image distortion meets the requirement when a difference between the maximum width value and a width of a specified line is not greater than the set threshold.

Optionally, the control apparatus is configured to determine a position corresponding to a maximum width value of the lines in the imaged picture; adjust a focal length of the image acquisition apparatus to enable the image acquisition apparatus to focus on the position corresponding to the maximum width value; determine a focal length when the image acquisition apparatus focuses on the position corresponding to the maximum width value; and determine whether the image distortion meets the requirement according to the focal length when the image acquisition apparatus focuses on the position corresponding to the maximum width value.

Optionally, the image acquisition apparatus is an illuminometer or a charge-coupled device camera.

Optionally, the image output device includes a head-up display or a holographic image output device.

DETAILED DESCRIPTION

The present disclosure will be described in further detail with reference to the accompanying drawings, to present the principles and advantages of the present disclosure more clearly.

Figure 1:
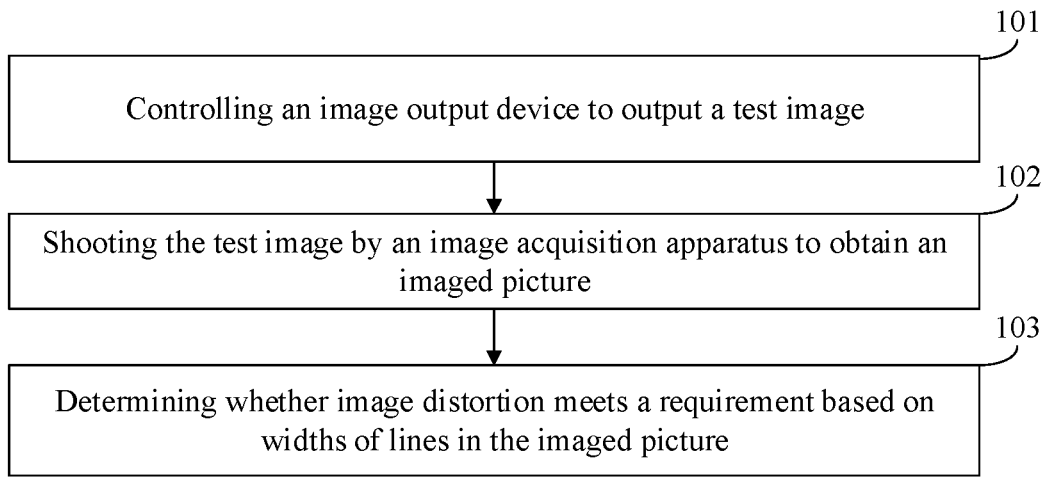
FIG. 1 is a schematic flowchart of an image distortion detection method provided by an embodiment of the present disclosure.

An embodiment of the present disclosure provides an image distortion detection method which can be configured to detect depth-of-field distortion of an image output by an image output device. FIG. 1 is a schematic flowchart of the image distortion detection method. As shown in FIG. 1, the method includes the following steps.

In step S101, an image output device is controlled to output a test image.

Here, the test image is an image output by the image output device after a test pattern is input.

In the present embodiment, the image output device refers to an image output device whose output image is not imaged on a physical imaging screen, and for example, may be a HUD, a holographic image output device or the like. The image output by the image output device may be a virtual image (such as an image output by the HUD) or a real image (such as a holographic image output by the holographic image output device).

Step S101 may include: lighting a display source of the image output device and inputting image data of the test pattern to the display source to enable the image output device to output the test image. Taking a projection-type HUD as an example, the projection-type HUD generally includes a display source, an optical system and an imaging screen (generally, a front windshield of an automobile). The display source is configured to output a pattern according to input image data; and the pattern is projected by the optical system to the imaging screen, and is imaged on the side of the imaging screen opposite to the display source.

Figure 2A:
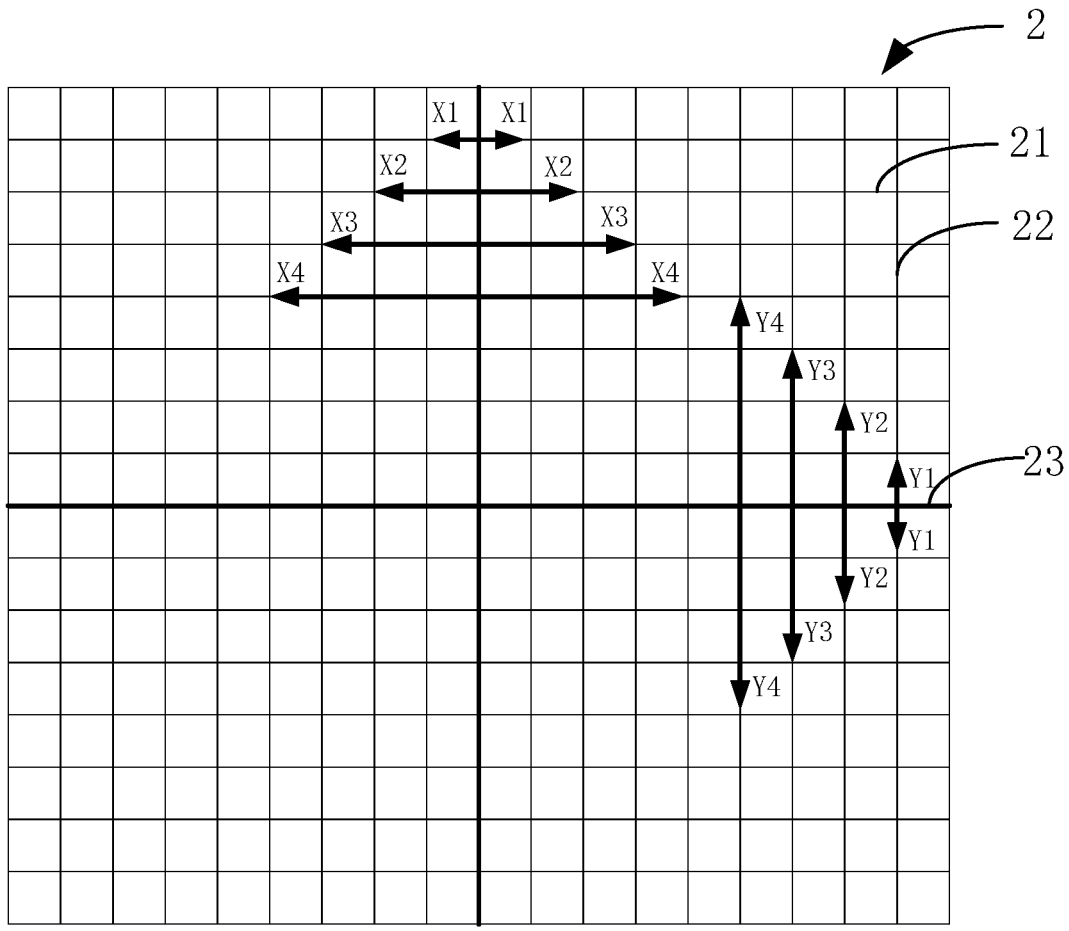
FIG. 2a is a schematic diagram of a grid pattern provided by an embodiment of the present disclosure.

In the present embodiment, the test pattern may be a grid pattern. FIG. 2a is a schematic diagram of a grid pattern provided by an embodiment of the present disclosure. As shown in FIG. 2a, the grid pattern 2 includes a plurality of first straight lines 21 parallel to and spaced from each other, and a plurality of second straight lines 22 parallel to and spaced from each other. The first straight lines 21 and the second straight lines 22 are intersected, and for example, are perpendicular to each other. Exemplarily, the first straight line 21 extends in a first direction, and the second straight line 22 extends in a second direction. The first direction may be a horizontal direction, and the second direction may be a vertical direction. The grid pattern can cover the entire imaging area of the image output device, so that distortion of the image output by the image output device can be reflected more effectively. In other embodiments, the extending directions of the first and second straight lines may be tilted directions at a set angle with respect to the horizontal direction.

Optionally, the grid pattern may be an equidistant grid pattern or an equiangular grid pattern.

In the equidistant grid pattern, distances between each two adjacent first straight lines 21 are the same. Distances between each two adjacent second straight lines 22 are the same. In addition, the distance between each two adjacent first straight lines 21 is equal to the distance between each two adjacent second straight lines 22. That is, in FIG. 2a, Xn=nX1. Here, X1 is the distance between the middlemost second straight line 22 (recorded as the $0^{th}$ second straight line) in the plurality of second straight lines 22 and the adjacent second straight line 22; and Xn is the distance between the $n^{th}$ second straight line on one side of the $0^{th}$ second straight line and the $0^{th}$ second straight line. Y1=X1, and Yn=nY1. Here, Y1 is the distance between the middlemost first straight line 21 (recorded as the $0^{th}$ first straight line) in the plurality of first straight lines 21 and the adjacent first straight line 21; and Yn is the distance between the $n^{th}$ first straight line 21 on one side of the $0^{th}$ first straight line 21 and the $0^{th}$ first straight line 21. When the first direction is the horizontal direction and the second direction is the vertical direction, the $0^{th}$ first straight line is the horizontal center line of the grid pattern, and the $0^{th}$ second straight line is the vertical center line of the grid pattern.

Figure 2B:
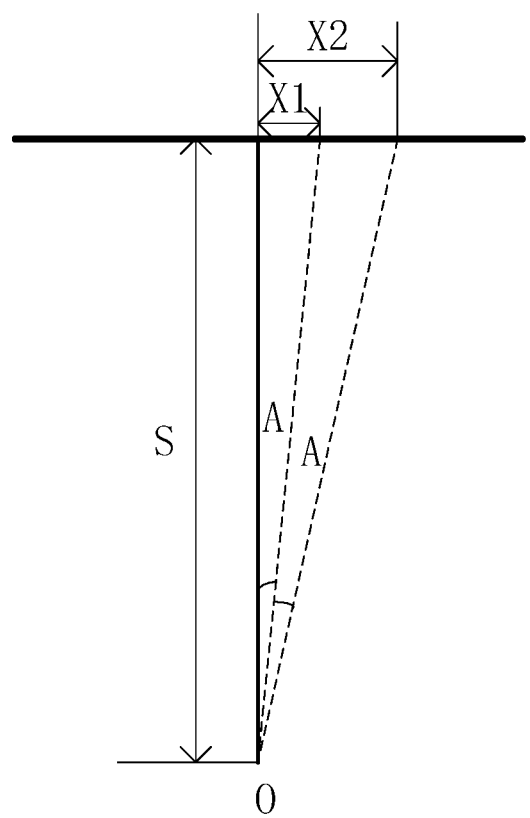
FIG. 2b is a schematic diagram of an equiangular grid pattern provided by an embodiment of the present disclosure.

In the equiangular grid pattern, as shown in FIG. 2b, each included angle formed by lines connecting a set viewpoint O and two intersections of a perpendicular line with two adjacent first straight lines 21 is set to a fixed angle A; and each included angle formed by lines connecting the set viewpoint O and two intersections of a perpendicular line with any two adjacent second straight lines 22 is also set to the fixed angle A. In FIG. 2b, an included angle formed by lines connecting the set viewpoint O and two intersections on the $0^{th}$ second straight line and the first second straight line on the right side of the $0^{th}$ second straight line and an included angle formed by lines connecting the set viewpoint O and two intersections on the first second straight line on the right side of the $0^{th}$ second straight line and the second straight line on the right side of the $0^{th}$ second straight line are taken as examples for illustration. Exemplarily, A=1°. Of course, other values, such as 0.5°, 1.5°, 2°, and the like can be set for the angle according to actual situations.

When A=1°, the distance between every two adjacent first straight lines and the distance between every two adjacent second straight lines can be determined by the following formulas:

$Yn=S*\tan(n\ °)$, and $Xm=S*\tan(m\ °)$.

Yn represents the distance from the $n^{th}$ first straight line on one side of the $0^{th}$ first straight line to the $0^{th}$ first straight line; Xm represents the distance from an $m^{th}$ second straight line on one side of the $0^{th}$ second straight line to the $0^{th}$ second straight line; and S is a set value. Exemplarily, S may be a distance between the set viewpoint and the imaging position of the image output device.

The equidistant grid pattern is easy to manufacture, and the lines therein are more evenly distributed and can more effectively reflect the distortion of the image. Thus, it is more convenient to use the equidistant grid to implement the present embodiment.

In other embodiments, the test pattern may further include a plurality of lines parallel to and spaced from each other. The plurality of lines parallel to and spaced from each other may extend in a horizontal direction, in a vertical direction, or in a tilted direction at a set angle with respect to the horizontal direction.

It should be noted that the widths of the all lines in the test pattern are the same. Here, the width of the line is the dimension in a direction perpendicular to the length direction of the line.

In step S102, the test image is shot by the image acquisition apparatus to obtain an imaged picture.

The imaged picture is a picture shot when the image acquisition apparatus focuses on an imaging position of the image output device; and the image acquisition apparatus is arranged at the set viewpoint of the image output device.

Figure 3:
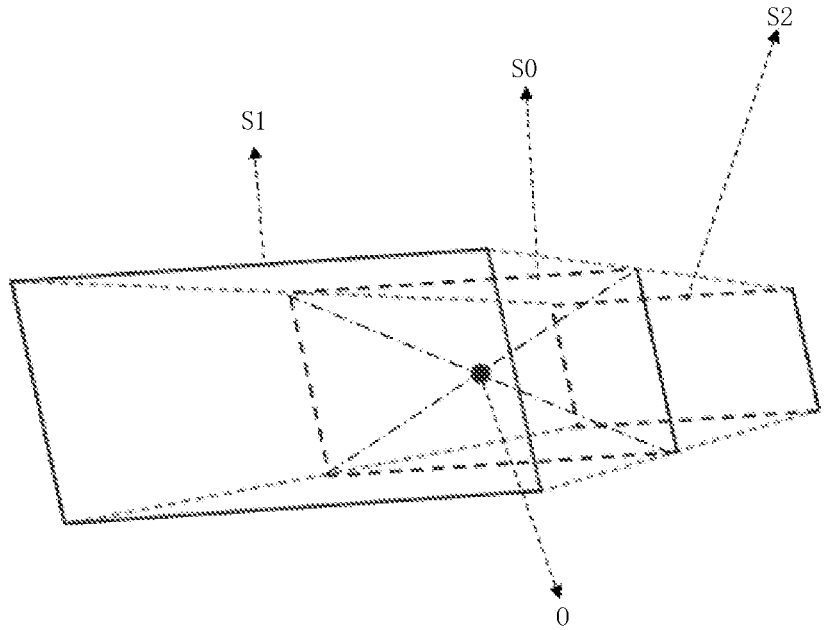
FIG. 3 is a schematic diagram of setting a set viewpoint provided by an embodiment of the present disclosure.

The image output device generally has an optimal viewing distance; and has an optimal viewing area S0 (see FIG. 3) which is a rectangular area arranged at the optimal viewing distance, being referred to as an eye box. As shown in FIG. 3, the set viewpoint may be the center point O of the rectangular area, namely, the intersection of the diagonals of the rectangular area. For a HUD, it generally further has a closest viewing area S1 and a farthest viewing area S2, and the optimal viewing area S0 is located between the closest viewing area S1 and the farthest viewing area S2. Exemplarily, the rectangular area may have a length between 140 mm and 160 mm and a width between 40 mm and 60 mm. The horizontal height of the rectangular area may be set according to actual needs. During the test, the center point O of the rectangular area and the center point of the test image may be set at the same horizontal height. By arranging the image acquisition apparatus at the set viewpoint, it means that the center of the lens of the image acquisition apparatus is located at the set viewpoint and the center line of the lens is aligned with the center point of the test image.

Exemplarily, the image acquisition apparatus may be an illuminometer (for example, BM_7 (a chroma and brightness tester produced by TOPCON Corporation in Japan)), a charge-coupled device (CCD) camera, or the like. By using the illuminometer to shoot the image, brightness data of each pixel point in the imaged picture can be obtained while acquiring the imaged picture. For example, pixel point position coordinates and the brightness data corresponding to the pixel point position coordinates may be obtained.

In an implementation of the embodiment of the present disclosure, step S102 may include: placing a reference object at the imaging position of the image output device, a distance between the imaging position and the set viewpoint being equal to a set imaging distance; and enabling the image acquisition apparatus to focus on the reference object and shoot the test image to obtain the imaged picture.

This implementation is suitable for the image output device whose imaging distance is known. By placing the reference object at the imaging position, the image acquisition apparatus can easily focus on the imaging position of the image output device to shoot; and this implementation is convenient and simple.

Exemplarily, a reference pattern is arranged on the reference object, and may be a double-cross-shaped pattern composed of four line-segments that intersect at one point. The four line-segments include a line-segment extending in the same direction as the first straight line. An included angle between any two adjacent line-segments is 45°. For example, in the present embodiment, the reference pattern has four diameters of a circle; and an included angle between any two adjacent diameters in the four diameters is 45°. Of course, the reference pattern may be other patterns, for example, including any one or a combination of any two selected from a group consisting of a letter, number and character, or any combination of at least one selected from a group consisting of the letter, number and character with a line.

Exemplarily, the reference object may include a base plate, and a coating, a sticker or the like on one side of the base plate. The coating or sticker is configured to display the reference pattern. In other embodiments, the reference object may also be an electronic display screen configured to display the reference pattern.

In order to conveniently adjust the position of the reference object, a lifting mechanism and/or a translation mechanism may be arranged on the reference object. The lifting mechanism is configured to adjust the height of the reference object in a Y direction (for example, the vertical direction). The translation mechanism includes an X-direction translation mechanism and a Z-direction translation mechanism. The Z direction is the extending direction of the center line of the lens of the image acquisition apparatus; and the X-direction is perpendicular to the Y direction and the Z direction. The lifting mechanism and the translation mechanism may adopt any existing mechanisms, including but not limited to a rack gear movement mechanism, a lead screw movement mechanism, and the like.

In another implementation of the embodiment of the present disclosure, step S102 may include: adjusting the focal length of the image acquisition apparatus at a set pitch, and shooting the test image after each adjustment to obtain a plurality of image pictures; and using the clearest image picture among the plurality of image pictures as the imaged picture. Generally, the picture shot when the image acquisition apparatus focuses on the imaging position of the image output device is the clearest. Thus, the clearest image picture among the plurality of image pictures may be considered as the picture shot when the image acquisition apparatus focuses on the imaging position of the image output device.

Exemplarily, the set pitch can be indicated by a scale on the lens of the image acquisition apparatus; and the lens may be rotated by one scale to perform each adjustment.

Optionally, the manner of determining the clearest image picture from the plurality of image pictures may include: determining a width of a set line in each of the image pictures; and using an image picture in which the width of the set line is the smallest as the imaged picture.

Optionally, determining the width of the set line in each image picture includes: determining widths of the set line at a plurality of measurement points, the plurality of measurement points being spaced on the set line along an extending direction of the set line; and determining the width of the set line according to the widths at the plurality of measurement points.

Here, the set line refers to a line at a set position in the image picture, and there may be at least one set line. The set lines in the all image pictures are the same.

For example, when the test pattern is composed of multiple parallel lines, the set line may be the middlemost line in the multiple parallel lines. In this case, an average of the width values at the plurality of measurement points can be used as the width of the set line.

In another example, when the test pattern is a grid pattern, the set line may include a middlemost line in the first direction and a middlemost line in the second direction in the grid pattern, namely, the cross-shaped center lines of the grid pattern (as shown at 23 in FIG. 2a). In this case, an average of the widths at the plurality of measurement points on each line can be calculated separately as the width of the respective line; and then, a sum of the widths of the respective lines or the average of the widths of the respective lines may be used as the width of the set line.

Of course, multiple lines at the middle of the test pattern may be selected as the set lines. However, in normal circumstances, the imaged picture can be accurately determined through the width of the center line of the test pattern, and the calculation process is simple. Thus, the center line of the test pattern is often used as the set line.

In order to ensure the accuracy of the width of the determined line, the number of the measurement points on each line is at least 10. For example, when the set line is the cross-shaped center lines of the grid pattern, the number of the measurement points on the set line in the first direction is at least 10, and the number of the measurement points on the set line in the second direction is also at least 10. It should be noted that the number of the measurement points on the set line in the first direction and the number of the measurement points on the set line in the second direction may be the same or different from each other, and may be set according to actual needs.

Exemplarily, the measurement points on the set line of the grid pattern may be set as follows. For the set line extending along the first direction, one measurement point can be arranged on the set line between every two adjacent second straight lines. For the set line extending along the second direction, a measurement point may be set on the set line between every two adjacent first straight lines.

This implementation is suitable for an image output device whose imaging distance is either known or unknown; and can be automatically determined by a smart device such as a computer, which has a high degree of automation.

In yet another implementation of the embodiment of the present disclosure, step S102 may include: manually adjusting the focal length of the image acquisition apparatus, and observing an imaging condition of the test image in the image acquisition apparatus until the image acquisition apparatus focuses on the test image; and shooting the test image to obtain the imaged picture.

In step S103, whether image distortion meets a requirement is determined based on widths of lines in the imaged picture.

If an image depth-of-field distortion exists, a line shot at the imaging position will become blurred and thicker. That is, the width of the line will be increased. Thus, the width of the line in the imaged picture reflects a degree of the image distortion. Thus, whether the image distortion meets the requirement can be determined based on the widths of the lines in the imaged picture, which can be performed through a manner shown in FIG. 4 or FIG. 5. Descriptions are made below with reference to FIGS. 4 and 5, respectively.

Figure 4:
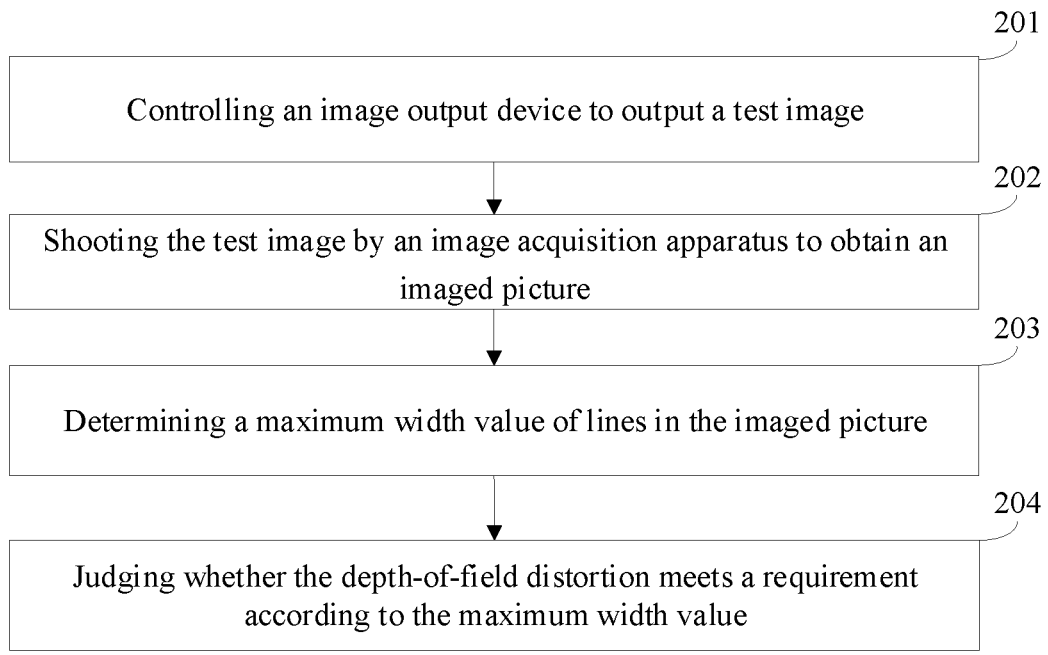
FIG. 4 is a schematic flowchart of another image distortion detection method provided by an embodiment of the present disclosure.

FIG. 4 is a schematic flowchart of an image distortion detection method provided by an embodiment of the present disclosure. As shown in FIG. 4, the method includes the follows steps.

In step S201, an image output device is controlled to output a test image.

In step S202, the test image is shot by an image acquisition apparatus to obtain an imaged picture.

For implementations of steps S201 and S202, reference can be made to the above steps S101 and S102; and detailed descriptions thereof are omitted here.

In step S203, a maximum width value of the lines in the imaged picture is determined.

In a first implementation, step S203 may include: converting the imaged picture into a grayscale image; binarizing the grayscale image to obtain a binarized image; in the binarized image, determining, for each line, a number of pixel points that are of a set value continuously in a direction perpendicular to an extending direction of the line; and using the largest number as the maximum width value of the lines. In this implementation, a CCD camera can be used as the image acquisition apparatus, so that the cost is lower. The set value indicates that the pixel point belongs to a line.

Exemplarily, binarizing the grayscale image includes: comparing a grayscale value of each pixel point in the grayscale image with a set threshold, and marking a pixel point whose grayscale value is greater than the set threshold as a first value (for example, 1) which indicates that the pixel point belongs to a line, and a pixel point whose grayscale value is not greater than the set threshold as a second value (for example, 0) which indicates that the pixel point does not belong to a line. The set threshold may be determined according to actual conditions as long as it can be used to determine whether a pixel point belongs to a line or not. The first value here is the set value in the first implementation.

Taking the above grid pattern in which the first straight lines and the second straight lines being perpendicular to each other, the first direction being the horizontal direction, and the second direction being the vertical direction, as an example, the determining, for each line in the binarized image, the number of pixel points that are of a set value continuously in a direction perpendicular to an extending direction of the line can be achieved through the following manner: determining the number of pixel points of each line that are of the first value continuously row by row; and determining the number of pixel points of each line that are of the first value continuously column by column. Here, the row direction is the horizontal direction, and the column direction is the vertical direction. It can be seen that by using such grid pattern as the test pattern, the number of the pixel points that are of the first value continuously can be determined by scanning row by row and column by column, and thus the implementation is simple and convenient.

In a second implementation, step S203 may include: acquiring brightness data of each pixel point in the imaged picture; determining two edges of each of the lines in the imaged picture according to the brightness data; determining a distance, in a direction perpendicular to an extending direction of the line, between the two edges of each of the lines in the imaged picture; and using the greatest distance as the maximum width value of the lines. In this implementation, as the brightness data of the imaged picture needs to be used, it is required to use the illuminometer as the image acquisition apparatus.

Exemplarily, determining the two edges of each of the lines in the imaged picture according to the brightness data can be achieved through the following manner: determining a ratio of brightness values of two adjacent pixel points in a direction perpendicular to the extending direction of the line; and determining that the pixel point with the larger brightness in the two adjacent pixel points is an edge point of the line if the ratio is greater than or equal to a set value, or determining that neither of the two adjacent pixel points is an edge point of the line if the ratio is smaller than the set value. Optionally, the set value may be 10.

In step S204, whether the depth-of-field distortion meets the requirement is judged according to the maximum width value.

Step S204 can be implemented through any of the following manners.

It is determined that the image distortion meets the requirement when a ratio of the maximum width value to a width of a specified line is not greater than a set value, or it is determined that the image distortion does not meet the requirement when the ratio of the maximum width value to the width of the specified line is greater than the set value.

Or, it is determined that the image distortion meets the requirement when a difference between the maximum width value and a width of a specified line is not greater than a set value, or it is determined that the image distortion does not meet the requirement when the difference between the maximum width value and the width of the specified line is greater than the set value.

Or, it is determined that the image distortion meets the requirement when the maximum width value is not greater than a set threshold, or it is determined that the image distortion does not meet the requirement when the maximum width value is greater than the set threshold.

Optionally, the width of the specified line is the minimum width value or the average width of the lines or the width of the set line (for example, the width of the above cross-shaped center lines) in the imaged picture. Here, for determining the minimum width value of the lines, reference can be made to the above determination manner of the maximum width value, and detailed descriptions thereof are omitted herein. For determination of the width of the set line, reference can be made to the above descriptions of step S102. The average width of the lines in the imaged picture is obtained by processing all the lines in the imaged picture according to a similar manner in processing the set line, to obtain widths of the each line, and the widths of all the lines are averaged to obtain the average width of the lines in the imaged picture.

Figure 5:
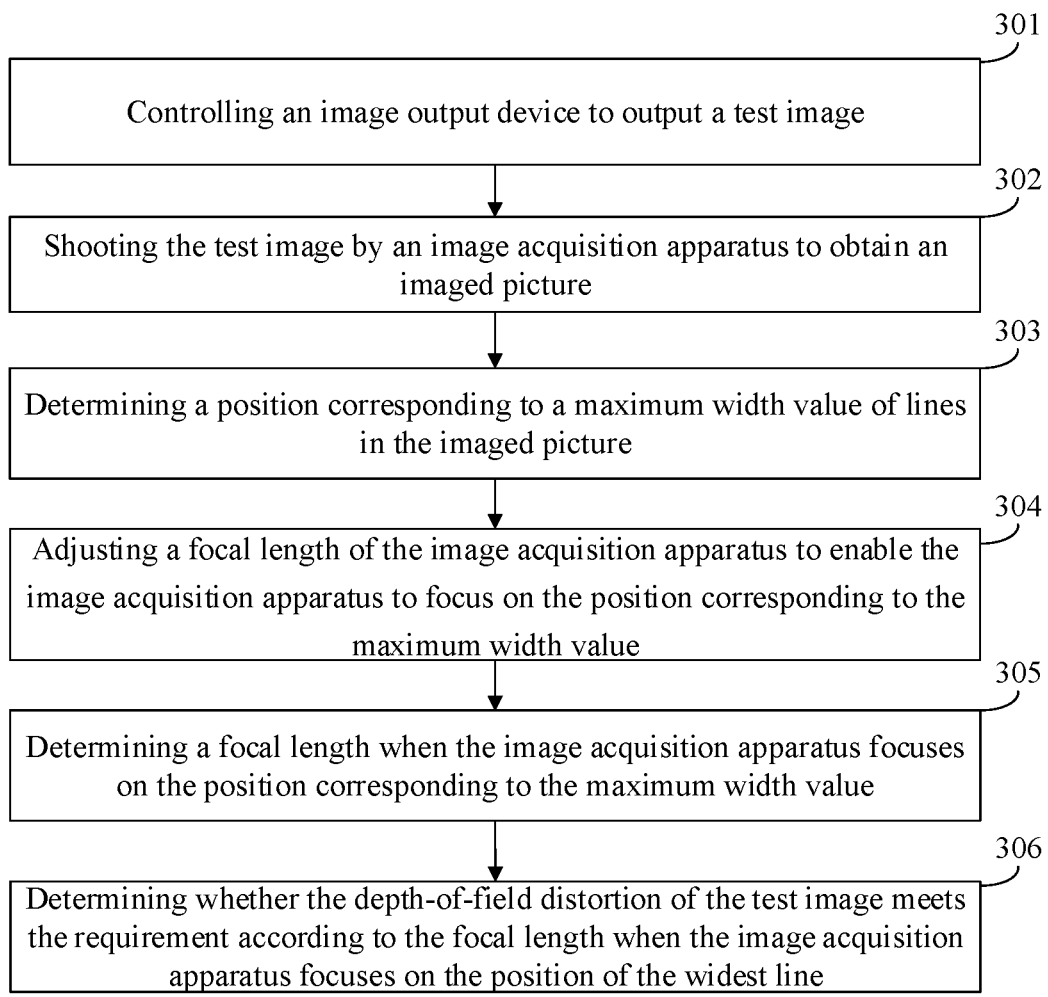
FIG. 5 is a schematic flowchart of yet another image distortion detection method provided by an embodiment of the present disclosure.

FIG. 5 is a schematic flowchart of another image distortion detection method provided by an embodiment of the present disclosure. As shown in FIG. 5, the method includes the follows steps.

In step S301, an image output device is controlled to output a test image.

In step S302, the test image is shot by an image acquisition apparatus to obtain an imaged picture.

For implementations of steps S301 and S302, reference can be made to the above steps S101 and S102; and detailed description thereof is omitted herein.

In step S303, a position corresponding to a maximum width value of lines in the imaged picture is determined.

Optionally, the line with the maximum width value in the imaged picture can be first determined, and the position where the line has the maximum width value is the position corresponding to the maximum width value of the lines in the imaged picture. For the manner for determining the line with the maximum width value in the imaged picture, reference can be made to the above step S203, and detailed description thereof is omitted herein.

Optionally, the imaged picture may be viewed with a naked eye to determine the position corresponding to the maximum width value of the lines in the imaged picture.

In step S304, a focal length of the image acquisition apparatus is adjusted to enable the image acquisition apparatus to focus on the position corresponding to the maximum width value.

In the step S304, enabling the adjusted image acquisition apparatus to focus on the position corresponding to the maximum width value means that the line at the position having the maximum width value can be clearly imaged in the image acquisition apparatus.

In an implementation, step S304 may include: adjusting the focal length of the image acquisition apparatus at a set pitch, and shooting the test image once after each adjustment to obtain a plurality of image pictures; determining widths of lines at the position corresponding to the maximum width value; and if a difference between the width of the line at the position corresponding to the maximum width value and the width of the above specified line does not exceed a set value, determining that the adjusted image acquisition apparatus focuses on the position corresponding to the maximum width value. Here, the width of the specified line may be the minimum width value or the average width of the lines or the width of the set line in the imaged picture.

In another implementation, whether the image acquisition apparatus focuses on the position corresponding to the maximum width value may be determined manually.

In step S305, a focal length when the image acquisition apparatus focuses on the position corresponding to the maximum width value is determined.

Step S305 may be implemented by the following manner: after the image acquisition apparatus focuses on the position corresponding to the maximum width value, placing a reference object at the focus position of the image acquisition apparatus; and determining a distance between the reference object and the image acquisition apparatus as the focal length when the image acquisition apparatus focuses on the position corresponding to the maximum width value.

In an implementation, placing the reference object at the focus position of the image acquisition apparatus includes: positioning the center of the reference object on a line connecting the center of the test image and a set viewpoint; adjusting a distance from the reference object to a set viewpoint, and when the reference object is imaged clearly, determining, according to the position of the reference object, the focal length when the image acquisition apparatus focuses on the position corresponding to the maximum width value. It is easy and convenient to implement by manually observing whether the reference object is placed at the focus position of the image acquisition apparatus.

In another implementation, placing the reference object at the focus position of the image acquisition apparatus includes: placing the center of the reference object on the straight line connecting the center of the test image and the set viewpoint; after the image acquisition apparatus focuses on the position corresponding to the maximum width value, adjusting the distance from the reference object to the set viewpoint at a set distance interval, and after each adjustment of the distance between the reference object and the set viewpoint, shooting, by the image acquisition apparatus, the reference object and the test image to obtain a first image; comparing a position of the reference object in the first image relative to the test image with a position of the reference object in a second image relative to the test image; and, if the position of the reference object in the first image relative to the test image is the same as the position of the reference object in the second image relative to the test image, determining that the reference object is located at the focus position of the image acquisition apparatus and the second image is obtained when the reference object is located at the imaging position of the image acquisition apparatus, and the image acquisition apparatus focuses on the imaging position to shoot the reference image and the test image.

For example, when the reference object is circular, and in the second image, the reference object is tangent to third lines above and below the horizontal center line of the grid pattern and third lines at the left and right of the vertical center line of the grid pattern respectively, then, when the reference object is tangent to third lines above and below the horizontal center line of the grid pattern and third lines at the left and right of the vertical center line of the grid pattern respectively in the first image, it means that the reference object is located at the focus position of the image acquisition apparatus.

Exemplarily, the adjustment of the distance between the reference object and the set viewpoint at the set distance interval may be executed within a range near the imaging distance of the image output device. As the depth-of-field distortion of an image generally occurs at positions near the imaging distance, the adjustment within the range near the imaging distance of the image output device can reduce the number of adjustments, so as to quickly determine the focus position of the image acquisition apparatus.

Figure 6:
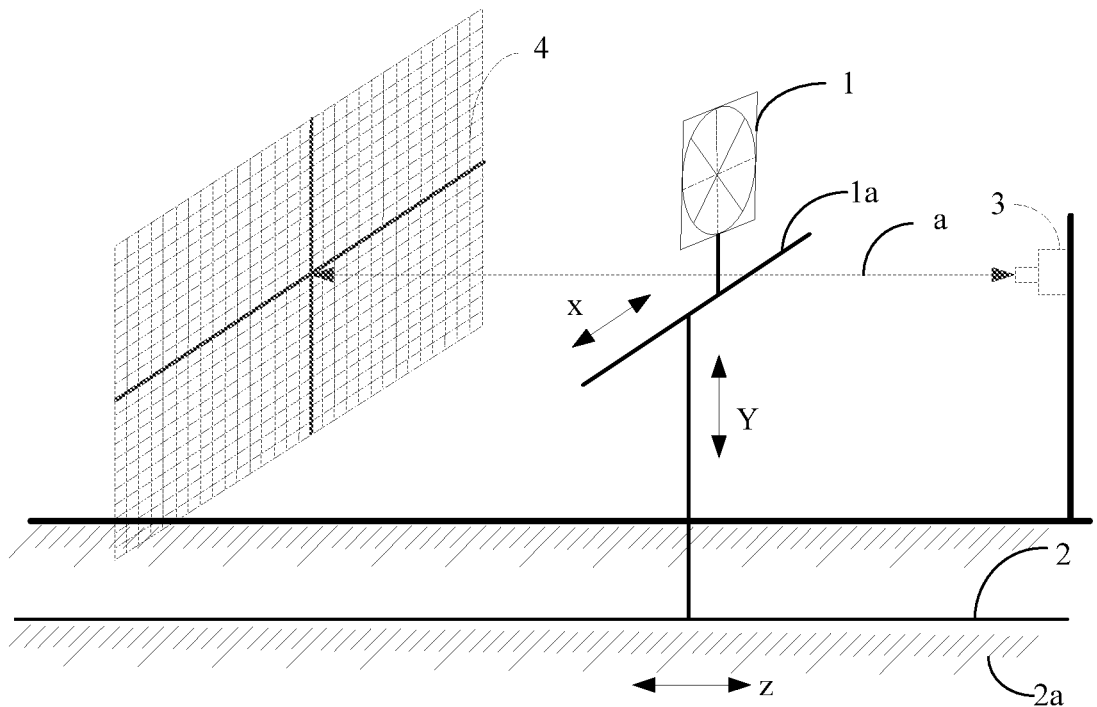
FIG. 6 is a schematic structural diagram of a focus position detection manner provided by an embodiment of the present disclosure.

Exemplarily, a linear guide rail may be arranged on a straight line where the center of the image acquisition apparatus and the center of the test image are located, and the reference object may be arranged on the linear guide rail. By moving the reference object on the linear guide rail, the position of the reference object relative to the image acquisition apparatus can be conveniently controlled. As shown in FIG. 6, the reference object 1 is arranged on a bracket 1a which is arranged on the linear guide rail 2, and the linear guide rail 2 is arranged in a direction along a line connecting the center of the lens of the image acquisition apparatus 3 and the center of the test image 4, as is shown by the arrow a in the figure, the bracket 1a may move along the linear guide rail 2, namely, in the Z direction. The reference object 1 is arranged on the bracket 1a, and may move in both the X direction and the Y direction on the bracket 1a. When implementing, the movement of the position of the reference object 1 can be achieved automatically under the drive of, for example, an electric motor, or may be achieved manually.

In an implementation, as shown in FIG. 6, scales 2a may be formed on or near the linear guide rail 2 to facilitate intuitive determination of the distance between the reference object 1 and the image acquisition apparatus 3. In another implementation, a position sensor may be arranged to detect the position of the reference object 1 on the linear guide rail 2 in real time; and a distance between the reference object 1 and the image acquisition apparatus 3 is determined according to the detected position.

In step S306, whether the depth-of-field distortion of the test image meets the requirement is determined according to the focal length when the image acquisition apparatus focuses at the position of the widest line.

Step S306 may include: determining that the image distortion meets the requirement if the focal length when the image acquisition apparatus focuses on the position corresponding to the maximum width value is within the set range, or determining that the image distortion does not meet the requirement if the focal length when the image acquisition apparatus focuses on the position corresponding to the maximum width value is not within the set range.

Exemplarily, the set range is determined according to the focal length of the image acquisition apparatus when shooting the imaged picture. Generally, the set range is presented as A±a, where a is greater than 0, A is the focal length of the image acquisition apparatus when shooting the imaged picture; and a is determined according to the distortion requirement on the image output device, and may be set according to actual requirements. The smaller the value of a is, the higher the requirement on the image distortion is.

In the present embodiment, the focal length of the image acquisition apparatus is adjusted based on the widest line in the imaged picture, and whether the depth-of-field distortion of the image meets the requirement is determined according to the focal length when the image acquisition apparatus focuses on the position of the widest line, as such, whether the image distortion meets the requirement is determined based on widths of the lines in the imaged picture.

It should be noted that in the test method provided by the embodiments of the present disclosure, the actual physical position of the image acquisition apparatus is fixed, and the focus position of the image acquisition apparatus is changed only by adjusting the focal length of the image acquisition apparatus.

Figure 7:
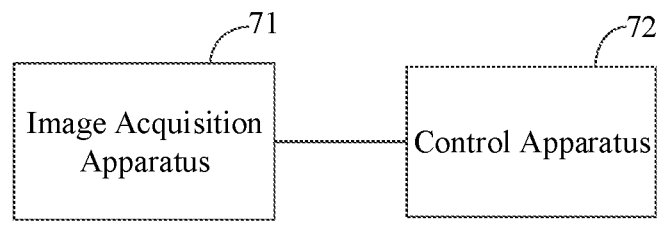
FIG. 7 is a schematic diagram of an image distortion detection system provided by an embodiment of the present disclosure.

An image distortion detection system, which can be configured to detect depth-of-field distortion of an image output by an image output device, is provided in some embodiments. FIG. 7 is a schematic structural diagram of the image distortion detection system provided by an embodiment of the present disclosure. As shown in FIG. 7, the image distortion detection system includes an image acquisition apparatus 71 and a control apparatus 72. The image acquisition apparatus 71 is configured to shoot a test image output by an image output device to obtain an imaged picture, wherein the imaged picture is a picture shot when the image acquisition apparatus focuses on an imaging position of the image output device, and the image acquisition apparatus 71 is arranged at a set viewpoint of the image output device. The control apparatus 72 is configured to determine whether image distortion meets a requirement based on the widths of lines in the imaged picture.

In an implementation, the image distortion detection system may further include a reference object. The reference object is placed at the imaging position of the image output device, and a distance between the imaging position and the set viewpoint is equal to a set imaging distance. The image acquisition apparatus 71 is configured to focus on the reference object to shoot the test image so as to obtain image pictures. This implementation is suitable for the image output device whose imaging distance is known.

In another implementation, the image acquisition apparatus 71 is configured to adjust the focal length at a set pitch, and shoot the test image once after each adjustment of the focal length to obtain a plurality of image pictures. The control apparatus 72 is configured to select the clearest image picture from the plurality of image pictures as the imaged picture. This implementation is suitable for an image output device whose imaging distance is known or unknown. For the specific implementing process of the implementation, reference can be made to the above step S102, and details thereof are not repeated herein.

The control apparatus 72 can determine whether the image distortion meets the requirements through either of the following implementations.

In a first implementation, the control apparatus 62 is configured to determine a maximum width value of the lines in the imaged picture; and determine that the image distortion meets the requirement when the maximum width value is not greater than a set threshold, or determine that the image distortion meets the requirement when a ratio of the maximum width value to a width of a specified line is not greater than a set threshold, or determine that the image distortion meets the requirement when a difference between the maximum width value and the width of the specified line is not greater than a set threshold. For the specific implementing process of the first implementation, reference can be made to related descriptions of the embodiment shown in FIG. 4, and detailed descriptions thereof are omitted here. In this implementation, the image processing technology can be adopted to determine whether the image distortion meets the requirement, which has a high degree of automation, and a system with a simple structure.

In a second implementation, the control apparatus 72 is configured to determine a position corresponding to a maximum width value of the lines in the imaged picture; adjust a focal length of the image acquisition apparatus to enable the image acquisition apparatus to focus on the position corresponding to the maximum width value; determine a focal length when the image acquisition apparatus focuses on the position corresponding to the maximum width value; and determine whether the image distortion meets the requirement according to the focal length when the image acquisition apparatus focuses on the position corresponding to the maximum width value.

In the second implementation, a linear guide rail can be arranged on a straight line where the center of the image acquisition apparatus (namely, the set viewpoint) and the center of the test image are located, and a reference object can be arranged on the linear guide rail. By moving the reference object on the linear guide rail, the position of the reference object relative to the image acquisition apparatus can be conveniently controlled.

Optionally, scales may be formed on or near the linear guide rail to facilitate intuitive determination of the distance between the reference object and the image acquisition apparatus. In another implementation, a position sensor may be arranged to detect the position of the reference object on the linear guide rail in real time. The control apparatus can determine a distance between the reference object and the image acquisition apparatus according to the detected position.

Optionally, a focal length adjustment apparatus for the image acquisition apparatus may be further arranged, and can rotate the lens of the image acquisition apparatus under the control of the control apparatus to adjust the focal length of the image acquisition apparatus at a set pitch.

For the arrangements of the image acquisition apparatus and the reference object, reference can be made to FIG. 6 and related descriptions, and details thereof are not repeated herein.

The foregoing descriptions are merely optional embodiments of the present disclosure, and are not intended to limit the scope of the present disclosure. Within the spirit and principles of the disclosure, any modifications, equivalent substitutions, improvements, etc., are within the protection scope defined by the appended claims of the present disclosure.

What is claimed is:

1. An image distortion detection method, comprising:
controlling an image output device to output a test image;
shooting the test image by an image acquisition apparatus to obtain an imaged picture, the imaged picture being a picture shot when the image acquisition apparatus focuses on an imaging position of the image output device, and the image acquisition apparatus being arranged at a set viewpoint of the image output device; and
determining whether image distortion meets a requirement based on widths of lines in the imaged picture,
wherein shooting the test image by the image acquisition apparatus to obtain the imaged picture comprises:
placing a reference object at the imaging position of the image output device, a distance between the imaging position and the set viewpoint being equal to a set imaging distance; and enabling the image acquisition apparatus to focus on the reference object and shoot the test image to obtain the imaged picture, or
adjusting a focal length of the image acquisition apparatus at a set pitch, and shooting the test image once after each adjustment to obtain a plurality of image pictures; and selecting a clearest image picture from the plurality of image pictures as the imaged picture.

2. The image distortion detection method of claim 1, wherein the test image is an image output by the image output device after a test pattern is input, and the test pattern is at least one selected from a group consisting of an equidistant grid pattern and an equiangular grid pattern.

3. The image distortion detection method of claim 1, wherein selecting the clearest image picture from the plurality of image pictures as the imaged picture comprises:
determining a width of a set line in each of the image pictures; and
using an image picture in which the width of the set line is smallest as the imaged picture.

4. The image distortion detection method of claim 3, wherein determining the width of the set line in each of the image pictures comprises:
determining widths of the set line at a plurality of measurement points, the plurality of measurement points being spaced on the set line at an interval along an extending direction of the set line; and
determining the width of the set line according to the widths at the plurality of measurement points.

5. The image distortion detection method of claim 1, wherein determining whether the image distortion meets the requirement based on the widths of the lines in the imaged picture comprises:
determining a maximum width value of the lines in the imaged picture;
determining that the image distortion meets the requirement when at least one condition selected from the following group is met:
the maximum width value being not greater than a set threshold;
a ratio of the maximum width value to a width of a specified line being not greater than a set threshold; or
a difference between the maximum width value and a width of a specified line being not greater than a set threshold.

6. The image distortion detection method of claim 5, wherein determining the maximum width value of the lines in the imaged picture comprises:
acquiring brightness data of the imaged picture;
determining two edges of each of the lines in the imaged picture according to the brightness data;
determining a distance, in a direction perpendicular to an extending direction of the line, between the two edges of each of the lines in the imaged picture; and
using the maximum distance among the determined distances as the maximum width value of the lines.

7. The image distortion detection method of claim 5, wherein determining the maximum width value of the lines in the imaged picture comprises:
converting the imaged picture into a grayscale image;
binarizing the grayscale image to obtain a binarized image;
determining, for each line in the binarized image, a number of pixel points that are of a set value continuously in a direction perpendicular to an extending direction of the line; and
using a largest number in the determined numbers of pixel points as the maximum width value of the lines.

8. The image distortion detection method of claim 1, wherein determining whether the image distortion meets the requirement based on the widths of the lines in the imaged picture comprises:
determining a position corresponding to a maximum width value of the lines in the imaged picture;
adjusting a focal length of the image acquisition apparatus to enable the image acquisition apparatus to focus on the position corresponding to the maximum width value;
determining a focal length when the image acquisition apparatus focuses on the position corresponding to the maximum width value; and
determining whether the image distortion meets the requirement according to the focal length when the image acquisition apparatus focuses on the position corresponding to the maximum width value.

9. The image distortion detection method of claim 8, wherein determining the focal length when the image acquisition apparatus focuses on the position corresponding to the maximum width value comprises:
placing, after the image acquisition apparatus focuses on the position corresponding to the maximum width value, a reference object at the focus position of the image acquisition apparatus; and
determining a distance between the reference object and the set viewpoint as the focal length when the image acquisition apparatus focuses on the position corresponding to the maximum width value.

10. The image distortion detection method of claim 8, wherein determining whether the image distortion meets the requirement according to the focal length when the image acquisition apparatus focuses on the position corresponding to the maximum width value comprises:
determining whether the focal length when the image acquisition apparatus focuses on the position corresponding to the maximum width value is within a set range,
wherein the focal length being within a set range indicates that the image distortion meets the requirement.

11. An image distortion detection system, comprising:
an image acquisition apparatus configured to shoot a test image output by an image output device to obtain an imaged picture, the imaged picture being a picture shot when the image acquisition apparatus focuses on an imaging position of the image output device, and the image acquisition apparatus being arranged at a set viewpoint of the image output device; and a control apparatus configured to determine whether image distortion meets a requirement based on widths of lines in the imaged picture, wherein the image acquisition apparatus is further configured to:

focus on a reference object comprised in the image distortion detection system and shoot the test image to obtain image pictures, wherein the reference object is configured to be located at the imaging position of the image output device, and a distance between the imaging position and the set viewpoint is equal to a set imaging distance; or adjust a focal length at a set pitch, and shoot the test image once after each adjustment of the focal length to obtain a plurality of image pictures, wherein the control apparatus is configured to select a clearest image picture from the plurality of image pictures as the imaged picture.

12. The image distortion detection system of claim 11, wherein in a case that the image distortion detection system further comprises the reference object, the distortion detection system further comprises a linear guide rail arranged on a straight line where the set viewpoint and a center of the test image are located, wherein the reference object is arranged on the linear guide rail.

13. The image distortion detection system of claim 11, wherein the control apparatus is configured to determine a maximum width value of the lines in the imaged picture; and determine that the image distortion meets the requirement when at least one condition selected from the following group is met: the maximum width value being not greater than a set threshold, a ratio of the maximum width value to a width of a specified line being not greater than a set threshold, or a difference between the maximum width value and a width of a specified line being not greater than a set threshold.

14. The image distortion detection system of claim 11, wherein the control apparatus is configured to determine a position corresponding to a maximum width value of the lines in the imaged picture; adjust a focal length of the image acquisition apparatus to enable the image acquisition apparatus to focus on the position corresponding to the maximum width value; determine a focal length when the image acquisition apparatus focuses on the position corresponding to the maximum width value; and determine whether the image distortion meets the requirement according to the focal length when the image acquisition apparatus focuses on the position corresponding to the maximum width value.

15. The image distortion detection system of claim 11, wherein the image acquisition apparatus is an illuminometer or a charge-coupled device camera.

16. The image distortion detection system of claim 11, wherein the image output device comprises a head-up display or a holographic image output device.

* * * * *